(12) United States Patent
Martin et al.

(10) Patent No.: US 9,098,260 B2
(45) Date of Patent: Aug. 4, 2015

(54) SYSTEM AND METHOD FOR OMITTING A CLOCK PULSE FROM A CLOCK SIGNAL IN RESPONSE TO A CHANGE IN CURRENT CONSUMPTION

(71) Applicant: Broadcom Corporation, Irvine, CA (US)

(72) Inventors: Simon Martin, Cambridge (GB); Terry Mackown, Histon (GB)

(73) Assignee: Broadcom Corporation, Irvine, CA (US)

( * ) Notice: Subject to any disclaimer, the term of this patent is extended or adjusted under 35 U.S.C. 154(b) by 276 days.

(21) Appl. No.: 13/655,713

(22) Filed: Oct. 19, 2012

(65) Prior Publication Data
US 2014/0115361 A1  Apr. 24, 2014

(51) Int. Cl.
*G06F 1/00* (2006.01)
*G06F 1/04* (2006.01)
*G06F 1/26* (2006.01)
*G06F 1/32* (2006.01)
*G06F 1/28* (2006.01)

(52) U.S. Cl.
CPC ... *G06F 1/26* (2013.01); *G06F 1/28* (2013.01)

(58) Field of Classification Search
CPC .............. G06F 1/26; G06F 1/324; G06F 1/28
USPC .......................... 713/300, 320, 322
See application file for complete search history.

(56) References Cited

U.S. PATENT DOCUMENTS

| | | | | |
|---|---|---|---|---|
| 6,304,978 | B1 * | 10/2001 | Horigan et al. | 713/322 |
| 6,636,976 | B1 * | 10/2003 | Grochowski et al. | 713/320 |
| 7,612,597 | B2 * | 11/2009 | Matsumoto | 327/291 |
| 7,937,563 | B2 * | 5/2011 | Naffziger et al. | 712/214 |
| 2008/0290847 | A1 * | 11/2008 | Mahrla | 323/234 |
| 2010/0229009 | A1 * | 9/2010 | Zhao et al. | 713/320 |

* cited by examiner

*Primary Examiner* — Mark Connolly
(74) *Attorney, Agent, or Firm* — McDermott Will & Emery LLP (57) ABSTRACT

Various embodiments of the present disclosure are directed to managing load steps caused by processing circuitry. The processing circuitry may generate a series of clock pulses at an average clock period. The processing circuitry may estimate a current consumption of the processing circuitry at each clock pulse. Accordingly, a clock pulse from the series of clock pulses may be omitted when a change in the current consumption exceeds a predetermined threshold amount, thereby increasing the average clock period.

20 Claims, 6 Drawing Sheets

SYSTEM AND METHOD FOR OMITTING A CLOCK PULSE FROM A CLOCK SIGNAL IN RESPONSE TO A CHANGE IN CURRENT CONSUMPTION

BACKGROUND

As processor cores increase in speed they may demand more current from a power supply. The degree in which processing circuitry draws current from a power supply may significantly vary over a relatively short period of time. These current consumption patterns by the processing circuitry may burden the power supply, thereby causing a ripple effect in the power supply current. A power supply ripple may lead to undesirable current variations in the power supply output. This may ultimately prevent the processing circuitry from properly functioning.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to managing current ripples originated by processing circuitry. A current ripple is an unwanted variation of the power supply output. Power supplies provide current to various devices in a computing system, such as a processor core. Various fluctuations in the power supply may lead to undesirable effects in the processing circuitry. The processing circuitry itself may be the cause for such current ripples. For example, processing circuitry that rapidly transitions from a low current consumption state to a high current consumption state may lead to load steps that cause power supply ripples.

In various embodiments of the present disclosure, processing circuitry is configured to reduce the amount of the change in current consumption by the processing circuitry over a period of time. According to some embodiments, the processing circuitry may estimate an amount of current consumption by the processing circuitry. The processing circuitry may determine that a change in current consumption is so large that the load of the processing circuitry on the power supply should be reduced. The processing circuitry may effectively reduce the clock speed of the processing circuitry in order to slow down operations performed by the processing circuitry. To this end, the processing circuitry preemptively reduces current consumption in response to an expected increase or decrease in current consumption.

Figure 1:
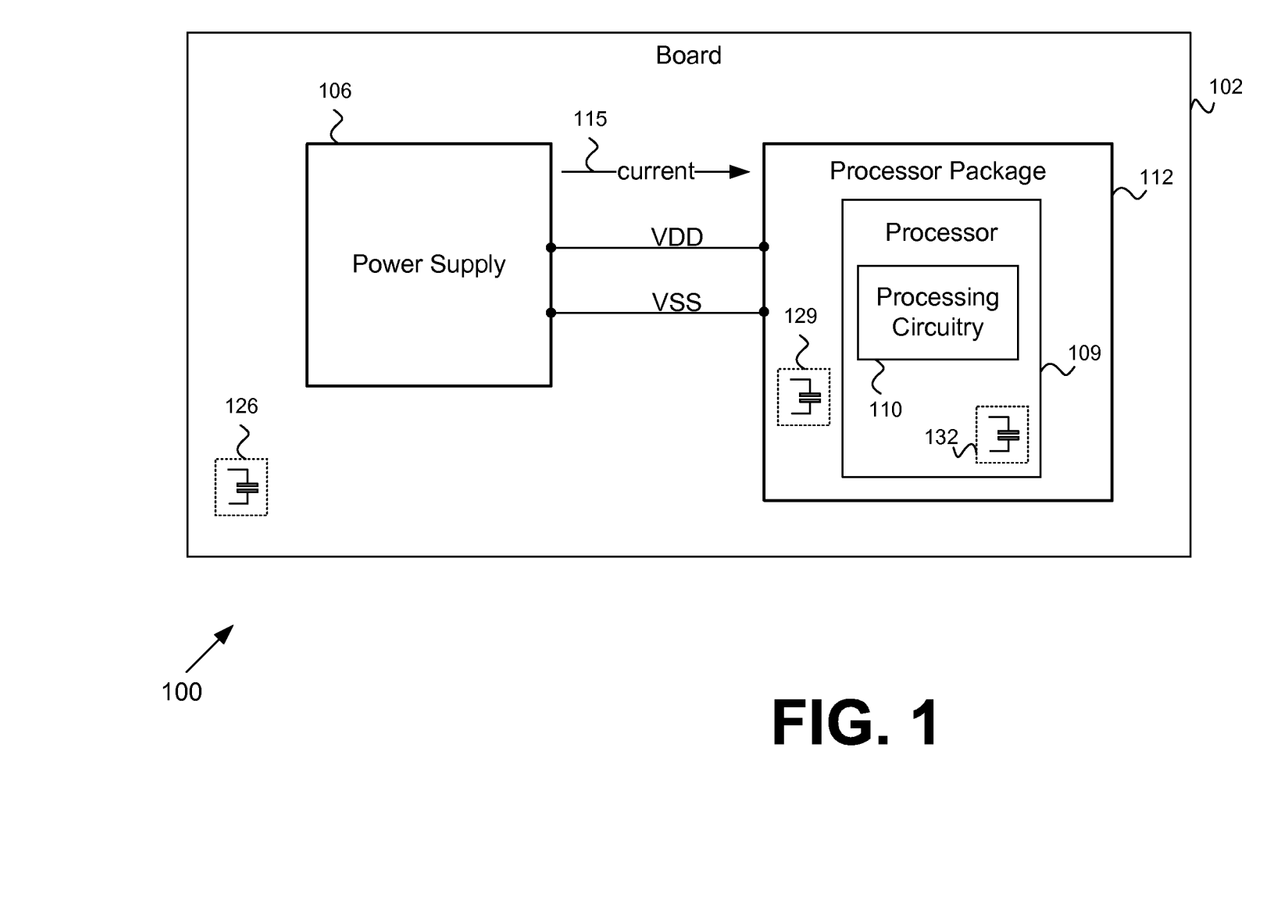
FIG. 1 is a drawing of a computing system according to various embodiments of the present disclosure.

With reference to FIG. 1, shown is a computing system 100 according to various embodiments of the present disclosure. The computing system 100 comprises a board 102. The board 102, for example, may be a printed circuit board or any other board configured for mounting circuits, wires, or any other electronic component. The board 102 comprises a power supply 106 and a processor 109. The power supply 106 is configured to supply electric power to any number of electrical loads on the board 102.

The processor 109 may be a semiconductor device comprising one or more circuits fabricated on a substrate. The processor 109 comprises processing circuitry 110 for implementing various computational processes. The processing circuitry may be, for example, a processor core. The processing circuitry 110 may comprise, for example, one or more circuits, application specific circuits, digital signal processors, one or more central processing units, field programmable gate arrays, programmable logic devices, state machines, or any combination thereof. In yet other embodiments, the processing circuitry 110 may include one or more software modules executable within one or more processing circuits of the processing circuitry 110. The processing circuitry 110 may further include memory configured to store instructions and/or code that causes the processing circuitry 110 to execute data processing functions.

The processor 109 may be encapsulated by a processor package 112. The processor package 112 physically protects the processor 109 from external environments. Furthermore, the processor package 112 provides electrical conductivity between the processor 109 and the board 102. The processor package 112 may comprise a package substrate.

The power supply 106 may provide power to the processing circuitry 110 through one or more pairs of voltage terminals. For example, the power supply 106 may provide a power line, VDD, and a ground line, VSS, to various electrical components on the board 102 and to the processing circuitry 110. To this end, the power supply 106 provides a current 115 for supplying power to the processing circuitry 110.

As the processing circuitry 110 initiates and terminates various processing operations, the amount of current consumption by the processing circuitry 110 may fluctuate. As the processing circuitry 110 operates at faster speeds, the change in current consumption may rapidly change. Rapid changes in current consumption due to executing/terminating processing operations by the processing circuitry 110 may be referred to as "load steps." Aggressive load steps may cause the power supply output current to ripple or otherwise vary in an undesirable manner. Voltage dips at the output of the power supply 106 may cause the processing circuitry 110 to malfunction.

However, as an additional source of power, the processing circuitry 110 may discharge various intrinsic capacitances 126, 129, 132 residing in the computing system 100. Intrinsic capacitances 126, 129, 132 reflect any parasitic or residual capacitance resulting from a physical implementation of the board 102 and the various components of the board 102. Intrinsic capacitances 126, 129, 132 may be modeled as equivalent capacitors.

The board 102 may comprise its own board-level intrinsic capacitance 126. The processor package 112 may comprise a package level-intrinsic capacitance 129. The processor 109 may comprise a processor-level or on-die capacitance 132. The board-level and package level intrinsic capacitances 126, 129, may be charged such that they absorb load steps generated from the processing circuitry 110. To this end, the board-level and package level intrinsic capacitances 126, 129, alleviate the load of the processing circuitry 110 on the power supply 106. Due to stray inductance in the path between the processing circuitry 110 and the board-level/package-level intrinsic capacitances 126, 129, the reaction to a change in load step may be slow or otherwise delayed for a particular length of time. However, the on-die capacitance 132 may be charged such that the on-die capacitance 132 temporarily provides power to the processing circuitry 110 until the board-level/package-level intrinsic capacitances 126, 129 respond. For example, the on-die capacitance 132 may provide power to the processing circuitry 110 for a particular number of clock cycles. In the case of aggressive load stepping, the charge stored in the on-die capacitance 132 may be insufficient to absorb large load steps. Accordingly, various embodiments of the present disclosure are directed to temporarily reducing an effective clock frequency associated with a load step event for reducing the rate of discharge of the on-die capacitance 132.

Various embodiments of the present disclosure are directed to estimating changes in current consumption by the processing circuitry 110. Based on estimated changes in the current consumption, the processing circuitry 110 may adjust the speed of operation of the processing circuitry 110 for preemptively controlling the current consumption. In this respect, the occurrence of aggressive load steps may be reduced or otherwise minimized and accordingly, a stable output of the power supply 106 may be achieved.

Figure 2:
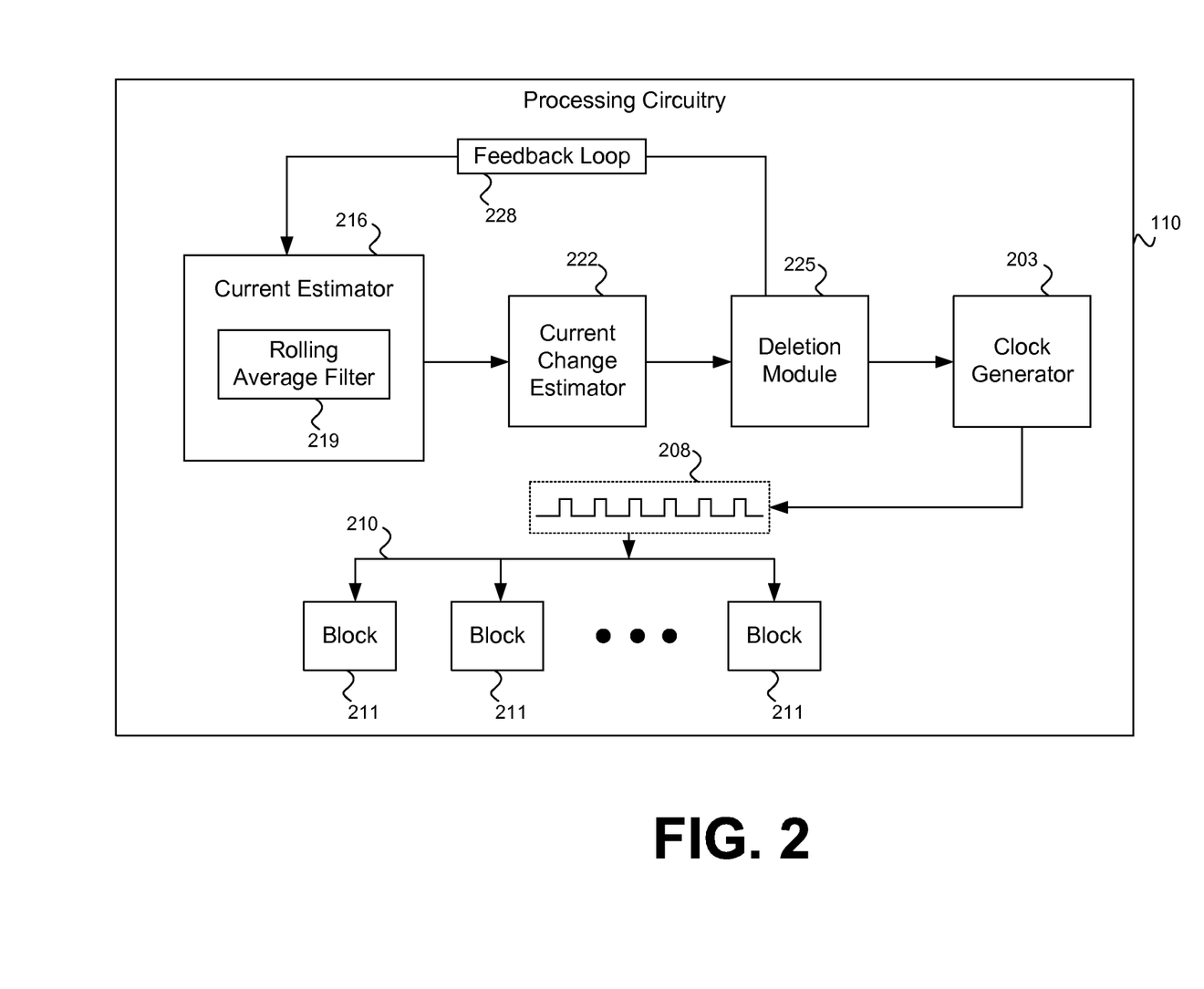
FIG. 2 is a drawing of an example of processing circuitry implemented within the computing system of FIG. 1 according to various embodiments of the present disclosure.

Turning now to FIG. 2, shown is an example of processing circuitry 110 implemented within the computing system 100 of FIG. 1 according to various embodiments of the present disclosure. The processing circuitry 110 comprises various components such as a clock generator 203, a current estimator 216, a current change estimator 222, a deletion module 225, and other components. Each component of the processing circuitry 110 may comprise one or more circuits, application specific circuits, digital signal processors, one or more central processing units, field programmable gate arrays, programmable logic devices, state machines, or any combination thereof. In yet other embodiments, the components of the processing circuitry 110 may be embodied as one or more software modules executable within one or more processing circuits.

The processing circuitry 110 comprises a clock generator 203 for generating a clock signal 208. Through the generation of the clock signal 208, the processing circuitry 110 may synchronize various processing operations. For example, the processing circuitry 110 may achieve a pipeline architecture through the distribution of the clock signal 208. Furthermore, the clock signal 208 may be characterized by an average clock period. For example, the clock signal 208 may comprise a series of clock pulses or clock cycles according to a clock period. The clock signal 208 may correlate to a speed in which the processing circuitry 110 performs various processing operations.

The clock signal 208 may control the rate in which the processing circuitry 110 executes processing operations. As a result, a shorter clock period may result in an execution of more processing operations for period of time, thereby increasing the amount of current consumption by the processing circuitry 110 for that period of time. Similarly, a longer clock period may result in an execution of fewer processing operations, thereby decreasing the amount of current consumption.

The clock signal 208 that is generated by the clock generator 203 may be distributed to various portions of the processing circuitry 110 via a clock tree 210. The clock tree 210 may distribute the clock signal 208 to one or more blocks 211. Each block 211 may correspond to a specific processing operation. Non-limiting examples of processing operations performed by the blocks 211 are floating-point operations, arithmetic logic unit operations, motion estimation, accelerators, digital signal processes, audio/video decoding operations, or any other computational processes. Each block 211 may represent processing circuitry that is configured to perform a specific process such that the specific process is not required to continuously be executed. That is to say, each block 211 may be enabled or disabled.

The processing circuitry 110 may comprise a current estimator 216 configured to estimate and amount of current consumption by the processing circuitry 110. The current estimator 216 may employ various current estimation processes as is described in further detail with respect to at least FIG. 3 and FIG. 4. In various embodiments, the current estimator 216 is configured to provide a current estimation at each clock pulse. Put another way, the current estimator 216 generates an estimation of the current consumed by the processing circuitry 110 on a per clock pulse basis. The current estimator 216 may comprise a rolling average filter 219, where the rolling average filter may achieve a smooth estimation over a predetermined number of clock cycles by performing various calculations for averaging a plurality of current consumption estimations.

The processing circuitry 110 may comprise a current change estimator 222 that is configured to estimate a change in current over a particular period of time. The current change estimator 222 may receive current consumption estimations from the current estimator 216 for determining a change in current consumption by the processing circuitry 110. For example, the current change estimator 222 may generate a di/dt value based on a plurality of current consumption estimations. In this respect, the current change estimator 222 detects the rate in which a current consumption of the processing circuitry 110 is increasing or decreasing.

The processing circuitry 110 further comprises a deletion module 225. The deletion module 225 receives the estimated change in current consumption that is generated by the current change estimator 222. Based on the estimated change in current consumption, the deletion module 225 may be configured to instruct the clock generator 203 to delete or otherwise omit a generation of one or more clock pulses from the clock signal 208. For example, if the estimated change in current consumption exceeds a predetermined threshold amount, then the deletion module 225 may generate a clock deletion event for removing one or more clock pulses from the clock signal 208. That is to say, if the change in current consumption is sufficiently large, the clock deletion event may be used to effectively increase the average clock period for causing the processing circuitry 110 to consume less current over a period of time. The clock deletion event may be transmitted from the deletion module 225 to the clock generator 203 for instructing the clock generator 203 to delete or otherwise omit a clock pulse.

Furthermore, the processing circuitry 110 may comprise a feedback loop 228 that communicatively couples the deletion module 225 to the current estimator 216. The feedback loop 228 may instruct the current estimator 216 to account for scheduled clock pulse removals. Deleting, removing, or otherwise omitting a clock pulse from a clock signal 208 causes the processing circuitry 110 to operate at a lower frequency/longer clock period such that the current consumed by the processing circuitry 110 is reduced. Accordingly, an expected reduction in the current consumption by the processing circuitry 110 may be considered by the current estimator 216. Through the feedback loop 228, the current estimator 216 may account for the expected reduction in current consumption.

Figure 3:
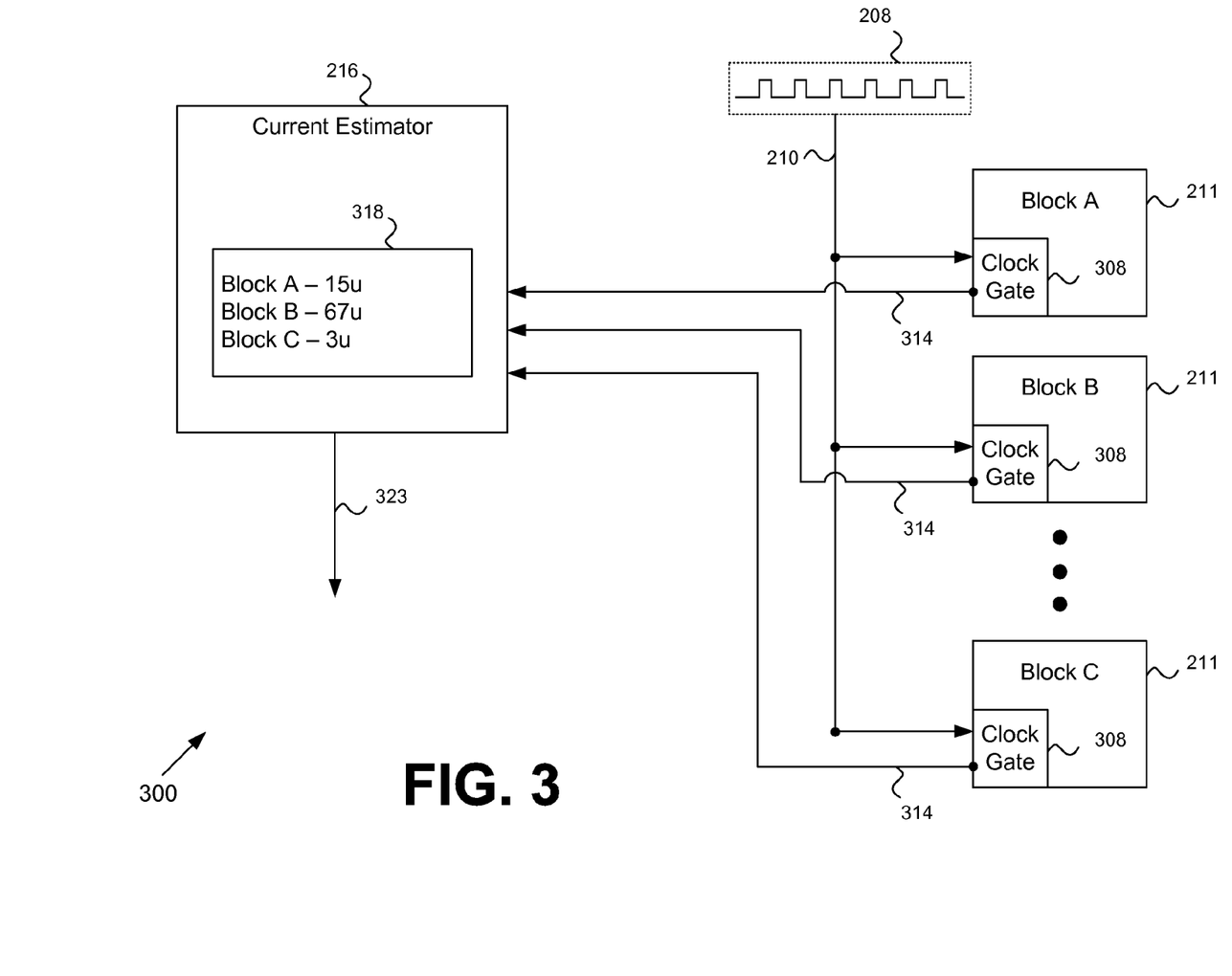
FIG. 3 is a drawing of an example of a current estimation process implemented within the processing circuitry of the computing system of FIG. 1 according to various embodiments of the present disclosure.

Next, in FIG. 3, shown is an example of the current estimation process 300 implemented within the processing circuitry 110 (FIG. 1) of the computing system 100 of FIG. 1 according to various embodiments of the present disclosure. FIG. 3 provides a non-limiting example of estimating current consumption of the processing circuitry 110 by analyzing a clock tree 210.

The current estimation process 300 may be implemented by a current estimator 216 that is executed within the processing circuitry 110. A current estimator 216 executing the current estimation process 300 of FIG. 3 analyzes the clock tree 210 to determine the identities of blocks 211 that are enabled at a specific point in time. Each block 211 may be associated with a predetermined current consumption amount. Based on the blocks 211 that are enabled, the current estimator 216 may perform a weighted sum calculation for estimating the current consumption of the processing circuitry 110 at the specific point in time.

Specifically the current estimation process 300 uses a clock tree 210 that distributes a clock signal 208 to plurality of blocks 211 such as, for example, block A, block B, block C, etc. Each block 211 may correspond to a specific computational process. Some computational processes require a relatively large amount of processing resources. Accordingly such computational processes may consume larger amounts of current. To this end, block A may consume significantly less current than block B.

Each block 211 may comprise a clock gate 308. A clock gate 308 receives the clock signal 208 for driving the block 211. When a particular block 211 is active such that the block 211 is powered on to execute a specific computational process, the clock gate 308 relays the clock signal 208 to the corresponding block 211. Furthermore, the clock gate may utilize an enable signal 314 for permitting the clock gate 308 to transmit the clock signal 208 to various portions of the block 211. To this end, the clock gate 308 may be implemented as a switch that is triggered according to the value of the enable signal 314.

An active enable signal 314 indicates that a particular block 211 is active such that the block 211 is presently configured to receive a clock signal 208. An enable signal 314 that is not active indicates that a particular block 211 is not enabled for presently executing a computational process. That is to say, an enable signal that is not active prevents the clock gate 308 from relaying a clock signal 208 to the block 211.

The current estimator 216 may be configured to receive the enable signal 314 from each of the blocks 211 of the processing circuitry 110. Based on the received enable signals 314, the current estimator 216 may determine the identities of the blocks 211 that are presently being executed to perform a specific competition process. The current estimator 216 may consult a block lookup table 318 for identifying a predetermined current consumption amount associated with a particular block 211.

As an example, assume that block A is dedicated to perform arithmetic logic unit (ALU) operations, block B is dedicated to perform motion estimation operations, and block C is dedicated to perform floating-point operations. It may be the case that for a particular clock cycle, block A and block C are active while block B is inactive. That is to say, the processing circuitry 110 is performing an ALU operation and a floating-point operation at a particular clock cycle while not performing a motion estimation operation. The current estimator 216 may receive enable signals 314 for determining that block A and block C are active or otherwise enabled. A block lookup table 318 may be used by the current estimator 216 for estimating a current consumption by the processing circuitry 110 for the particular clock cycle. Specifically, the current estimator 216 generates a current consumption estimation 323 as an output of the current estimator 216.

The block lookup table 318 may associate each block 211 with a corresponding predetermined current consumption amount. Each block 211 may be associated with a preprogrammed or predetermined estimation of current consumption that indicates the amount of current consumption attributed by the corresponding block 211. The predetermined current consumption amount may be expressed in terms of units of current per clock cycle, or any other unit for expressing current consumption for particular period of time. As seen in the non-limiting example of FIG. 3, block A is associated with 15 current consumption units, block B is associated with 67 current consumption units, and block C is associated with 3 current consumption units.

If block A and block C are active, the current estimator 216 may perform a weighted sum of the active blocks 211 for a particular clock cycle. Accordingly, the current estimator 216 may estimate that the current consumption for the particular clock cycle is 18 current consumption units. Thus, by accessing the enable signal 314 from each block 211, the current estimator 216 may generate a current consumption estimation 323 for a particular period of time.

If, for example, block B becomes enabled at a later clock cycle or subsequent clock pulse, then the current estimator 216 may generate a current consumption estimation 323 that considers block B as one of the blocks 211 that is contributing to the overall current consumption of the processing circuitry 110. The activation of block B, for example, may result is an increase in current consumption, thereby causing a load step for drawing more current from a power supply 106.

Figure 4:
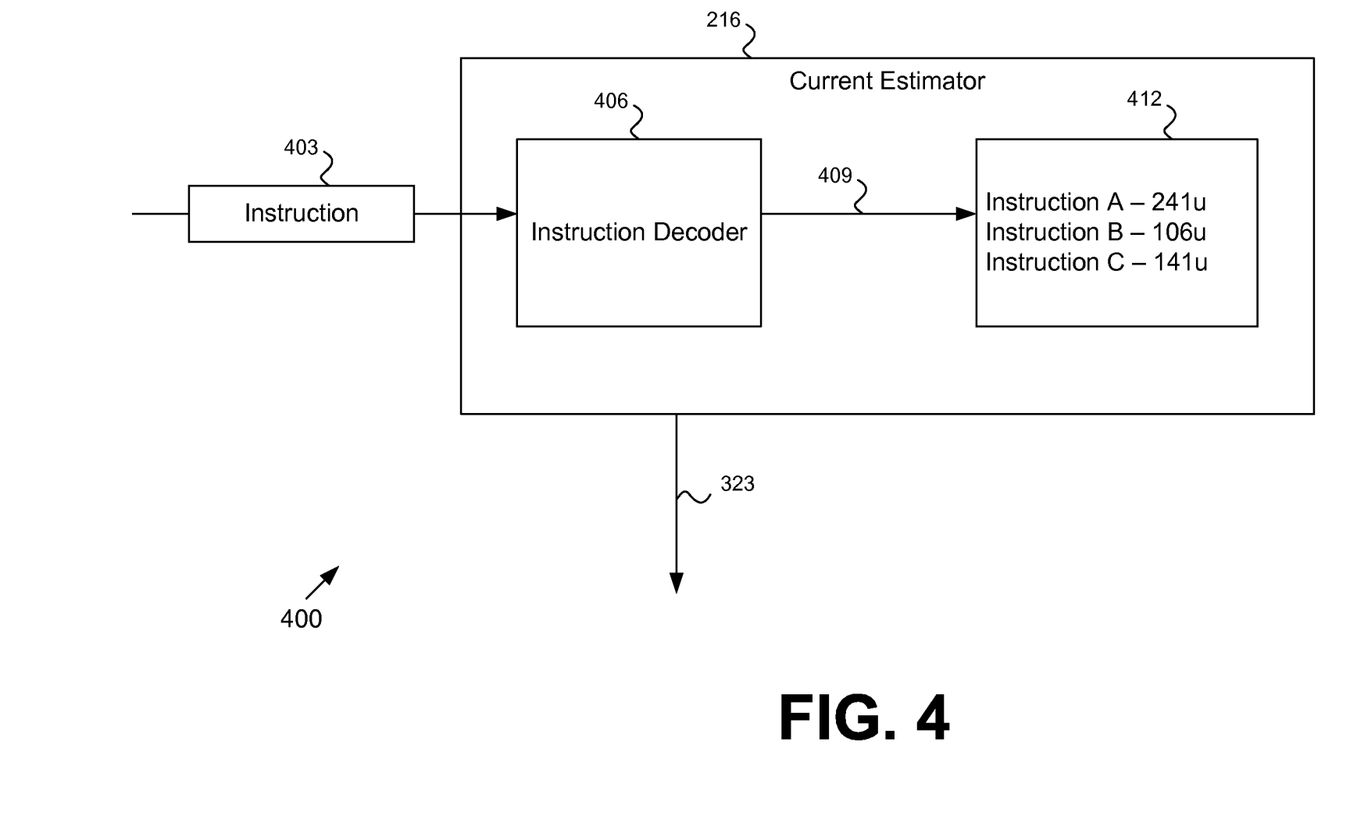
FIG. 4 is a drawing of an example of a current estimation process implemented within the processing circuitry of the computing system of FIG. 1 according to various embodiments of the present disclosure.

Turning now to FIG. 4, shown is an example of the current estimation process 400 implemented within the processing circuitry 110 (FIG. 1) of the computing system 100 of FIG. 1 according to various embodiments of the present disclosure. FIG. 4 provides a non-limiting example of estimating current consumption of the processing circuitry 110 by analyzing an instruction 403 that is processed by the processing circuitry 110. The current estimation process 400 of FIG. 4 may be an alternative to the current estimation process 300 of FIG. 3. That is to say, a current estimator 216 executed in a processing circuitry 110 may employ the current estimation process 300 of FIG. 3, the current estimation process 400 of FIG. 4, or any combination thereof.

In various embodiments, a current estimator 216 comprises an instruction decoder 406 that is configured to decode instructions 403. The instruction decoder 406 may decode an instruction 403 for identifying an instruction type 409 associated with the instruction 403. Non-limiting examples of instruction types 409 are floating-point instructions, ALU instructions, motion estimation instructions, hardware acceleration instructions, audio/video decoding instructions, or any other instruction that specifies a computational process. A particular instruction type 409 may require the execution of one or more blocks 211 (FIG. 2).

The current estimator 216 may map the instruction type 409 with respect to an instruction lookup table 412. The instruction lookup table 412 may associate a particular instruction type 409 to a predetermined current consumption amount. For example, if the current estimator 216 determines that a particular instruction 403 corresponds to a video decoding instruction referred to as instruction A, the current estimator 216 may reference the instruction lookup table 412 to associate the video decoding instruction to a predetermined current consumption amount of 241 units of current consumption. The output of the current estimator 216 is current consumption estimation 323 based on an instruction type 409 that is associated with a particular predetermined current consumption amount.

Figure 5:
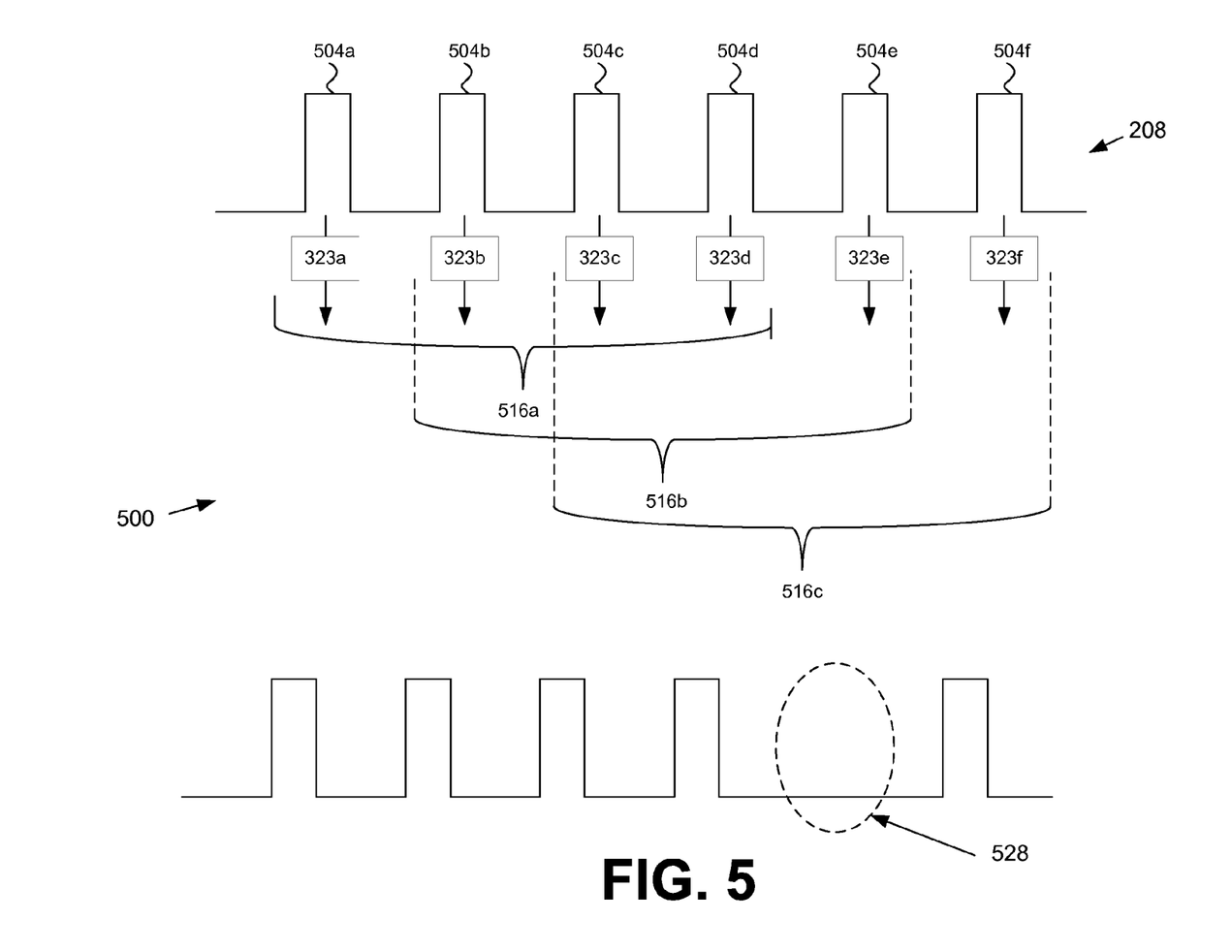
FIG. 5 is a drawing of an example of a clock regulation process implemented within the processing circuitry of the computing system of FIG. 1 according to various embodiments of the present disclosure.

Moving to FIG. 5, shown is a drawing of an example of a clock regulation process 500 implemented within the processing circuitry 110 (FIG. 1) of the computing system 100 of FIG. 1 according to various embodiments of the present disclosure. The non-limiting example FIG. 5 illustrates using a plurality of current consumption estimations 323 to determine whether to regulate the clock signal 208. Further, the non-limiting example FIG. 5 illustrates removing, omitting, or otherwise deleting a clock pulse from a clock signal 208 to increase the clock period to cause a reduced current consumption.

The clock signal 208 may comprise a series of clock pulses 504*a-f*. The series of clock pulses may be characterized by an average clock period. A current estimator 216 (FIG. 2) may generate a current consumption estimation 323. According to various embodiments of the present disclosure, a current consumption estimation 323 may be generated at each clock pulse 504. In this respect, each clock pulse 504*a-f* corresponds to a respective current consumption estimation 323*a-f*. Based on a plurality of the current consumption estimations 323*a-f*, a current change estimator 222 (FIG. 2) that is executed as a portion of the processing circuitry 110 may detect a change in current consumption.

In various embodiments of the present disclosure, the current estimator 216 employs a rolling average filter 219 (FIG. 2) for averaging a predetermined number of current consumption estimations 323*a-f*. The rolling average filter 219 may be configured to average the current consumption estimation 323 for a predetermined number of clock pulses 504. In the non-limiting example of FIG. 5, the rolling average filter 219 uses a value of four clock pulses 504 for generating a rolling average of the current consumption estimation 323. The predetermined number of clock cycles may be determined based on the on-die capacitance 132 (FIG. 1). The on-die capacitance 132 may power the processing circuitry 110 for a number of clock cycles while the rolling average filter 219 generates the rolling average. To this end, the rolling average filter 219 leverages the on-die capacitance 132 for smoothening the current consumption estimation 323 over a number of clock pulses.

As seen in the non-limiting example FIG. 5, a first rolling average 516*a* is determined by averaging the current consumption estimation 323*a-d* of the first four clock pulses 504*a-d* of the clock signal 208. As an example, the rolling average 516 may be determined by summing the estimated current consumptions 223 for a number of clock pulses and dividing the sum by the number of clock pulses.

The second rolling average 516*b* is determined by averaging the current consumption estimations 323*b-e* of the second through fifth clock pulses 504*b-e*. A third rolling average 516*c* is determined by averaging the current consumption estimations 323*c-f* of the third through sixth clock pulses 504*c-f*. Thus, the rolling average filter considers the current consumption estimations 323 associated with a predetermined number of the most recent clock pulses 504. Effectively, the current estimator 216 that is employed by the processing circuitry 110 determines a current consumption estimation 323 for a particular number of clock pulses.

Based on the current consumption estimation 323 and/or rolling average 516, the processing circuitry 110 may employ the current change estimator 222 to detect a rate of change in the current consumption of the processing circuitry 110. For example, the current change estimator 222 may calculate a differential value for determining a degree of increase or decrease in current consumption of the processing circuitry 110.

A deletion module 225 (FIG. 2) that is implemented as a portion of the processing circuitry 110 may compare the change in current consumption to a predetermined threshold amount. If the change in current consumption exceeds the predetermined threshold amount, then the deletion module 225 may generate a clock deletion event that instructs a clock generator 203 (FIG. 2) to generate a clock signal 208 with an omitted clock pulse 528. By removing one or more clock pulses from a clock signal 208, the average clock period of the clock signal is increased. This effectively slows down the clock for causing the processing circuitry 110 to perform computational operations at a slower rate. As a result, the current consumption of the processing circuitry 110 is reduced.

In various embodiments, the deletion module 225 sends a feedback signal to the current estimator 216 to account for an expected increase in the clock period. In various embodiments, the clock deletion module 225 may insert a value into the rolling average calculation for forcing a reduction in the rolling average 516. For example, a value that is relatively low, such as zero, may be supplied to the rolling average filter 219 when generating a rolling average 516 for the predetermined number of clock pulses 504. To this end, the current estimator 216 may adjust the current consumption estimation 323 in response to an expected reduction in the current consumption of the processing circuitry 110 caused by a clock deletion event.

Figure 6:
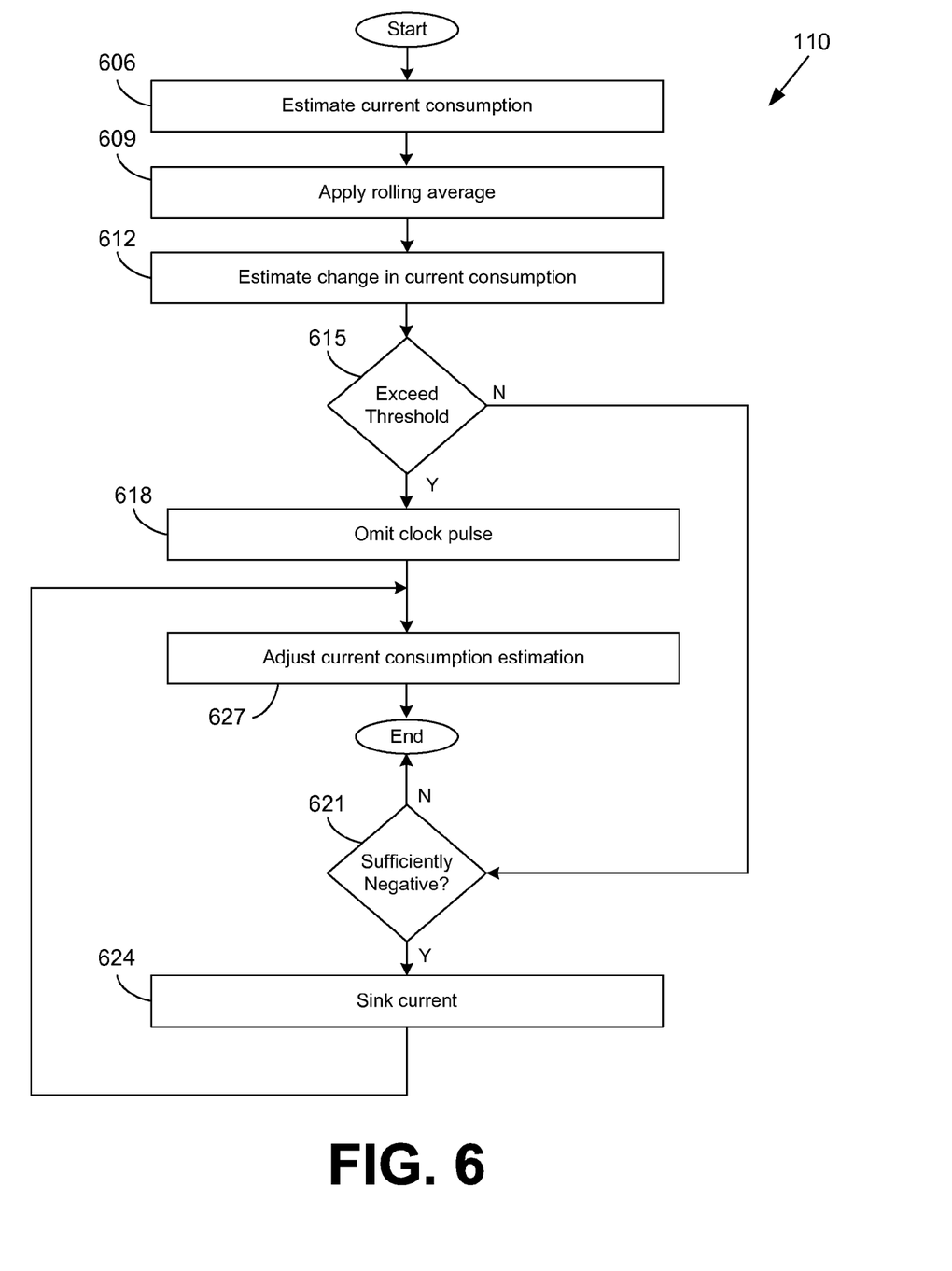
FIG. 6 is a flowchart illustrating one example of functionality implemented as portions of the processing circuitry of the computing system of FIG. 1 according to various embodiments of the present disclosure.

Turning now to FIG. 6, shown is a flowchart illustrating one example of functionality implemented as portions of the processing circuitry 110 in a computing system 100 of FIG. 1 according to various embodiments of the present disclosure. It is understood that the flowchart of FIG. 6 provides merely an example of the many different types of functional arrangements that may be employed to implement the operation of the portion of the logic executed by the processing circuitry 110 as described herein. As an alternative, the flowchart of FIG. 6 may be viewed as depicting an example of steps of a method implemented in the processing circuitry 110 according to one or more embodiments.

Beginning with reference number 606, the processing circuitry 110 estimates a current consumption. Initially, the processing circuitry 110 may generate a series of clock pulses at an average clock period using a clock generator 203 (FIG. 2). The series of clock pulses make up a clock signal 208 (FIG. 2). The clock signal 208 drives a plurality of blocks 211 (FIG. 2) that cause the processing circuitry 110 to consume current. The period of the clock signal 208 affects the amount of current consumption by the processing circuitry 110.

A current estimator 216 (FIG. 2) may be implemented as a portion of the processing circuitry 110 for estimating current consumption. In various embodiments, the current estimator 216 may analyze a clock tree 210 (FIG. 2) for estimating the current consumption of processing circuitry 110 as seen in the non-limiting example FIG. 3. In other embodiments, the current estimator 216 analyzes an instruction 403 (FIG. 4) as seen in the non-limiting example of FIG. 4. In various embodiments, the current estimator 216 may generate a current consumption estimation 323 (FIG. 3) associated for each clock pulse 504 (FIG. 5) or for a particular set of clock pulses.

At reference number 609, the processing circuitry 110 applies a rolling average filter 219 (FIG. 2) for determining a rolling average based on a plurality of current consumption estimations 323. For example, a rolling average filter 219 may be implemented as a portion of the current estimator 216 for averaging current consumption estimations 323 associated with a predetermined number of clock pulses 504. In some embodiments, the processing circuitry 110 may obtain a temperature reading associated with the temperature of the processing circuitry 110. The current estimator 216 may be estimate the current consumption according to the temperature reading.

At reference number 612, the processing circuitry 110 estimates a change in current consumption. For example, a current change estimator 222 (FIG. 2) that is implemented as a portion of the processing circuitry 110 may determine a differential value based on a plurality of current consumption estimations 323. To this end, the current change estimator 222 detects a rate at which the current consumption of the processing circuitry 110 is changing. In this respect, the processing circuitry 110 identifies imminent load steps that may potentially cause a ripple current at the output of the power supply 106 (FIG. 1).

At reference number 615, the processing circuitry 110 compares the change in the current consumption to a first predetermined threshold amount. For example, a deletion module 225 (FIG. 2) that is implemented as a portion of the processing circuitry 110 may determine when the first predetermined threshold amount is exceeded. When first the predetermined threshold amount is exceeded, the processing circuitry 110 branches to reference number 618.

At reference number 618, the processing circuitry 110 omits a clock pulse. For example, the deletion module 225 causes the omission of one or more clock pulses from the series of clock pulses of the clock signal 208 in order to cause the average clock period of the clock signal 208 to increase. By increasing the average clock period of the clock signal 208, the processing circuitry 110 directs the amount current consumption to be reduced.

At reference number 615, when the first predetermined threshold amount is not exceeded, the processing circuitry 110 branches to reference number 621. At reference number 621, the processing circuitry 110 determines whether the change in current consumption falls below a second predetermined threshold amount. In this respect, the processing circuitry 110 detects whether the processing circuitry 110 has transitioned from a high current state to a low current state. If the processing circuitry 110 is terminating a number of computational processes that consume a significant amount of current, then the current consumption amount may drop such an extent that causes a ripple current effect to result at the output of the power supply 106. If the change in current consumption is not sufficiently negative such that the change in current consumption does not fall below the second predetermined threshold amount, then the process of flowchart of FIG. 6 terminates.

However, if the change in current consumption is significantly negative such that the change in current consumption falls below the second predetermined threshold amount, the processing circuitry 110 may sink the current, as seen at reference number 624. The processing circuitry 110 may comprise a current sink coupled between a pair of power source terminals of the processing circuitry 110. By sinking the current over a period of time, the processing circuitry 110 may reduce the likelihood of a drastic current drop.

At reference number 627, the processing circuitry 110 adjusts the current consumption estimation. For example, the processing circuitry 110 may employ feedback loop 228 (FIG. 2) for adjusting the current estimation performed by the current estimator 216. In various embodiments, the processing circuitry 110 may direct the current consumption estimation 323 to be reduced in response to a clock deletion event that causes one more clock pulses to be omitted from the clock signal 208. Furthermore, the processing circuitry 110 may force the current consumption estimation 323 to be increased in response to using one or more current sinks.

The various components of the processing circuitry 110 implemented in the computing system 100 (FIG. 1), and other various systems described herein may be embodied in software or code executed by general purpose hardware. As an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 6 shows the functionality and operation of an implementation of portions of the processing circuitry 110 implemented in the computing system 100. If embodied in software, each block, indicated by a reference number, may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as processing circuitry 110 in a computer system or other system. The machine code may be converted from the source code, etc. If embodied in hardware, each block, indicated by a reference number, may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including components or modules of the processing circuitry 110 that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A method comprising:
   generating, by processing circuitry, a series of clock pulses at an average clock period;
   estimating a current consumption of the processing circuitry at each clock pulse based on an identification of a block of the processing circuitry that is currently active during that clock pulse; and
   omitting a clock pulse from the series of clock pulses based at least upon a change in the current consumption and a predetermined threshold amount, thereby increasing the average clock period.

2. The method of claim 1, wherein estimating the current consumption of the processing circuitry at each clock pulse comprises estimating according to a rolling average of a predetermined number of clock pulses.

3. The method of claim 2, further comprising adjusting the rolling average in response to omitting the clock pulse.

4. The method of claim 3, wherein adjusting the rolling average comprises inserting a value into a rolling average calculation for lowering the rolling average.

5. The method of claim 1, wherein estimating the current consumption further comprises:
   identifying an instruction type for an instruction executed by the processing circuitry; and
   mapping the instruction type to a predetermined current consumption amount based at least upon a lookup table.

6. The method of claim 1, wherein estimating the current consumption further comprises:
   receiving a respective enable signal from each of a plurality of blocks of the processing circuitry; and
   estimating the current consumption based at least upon respective enable signals.

7. The method of claim 1, wherein estimating the current consumption further comprises estimating according to a temperature reading associated with the processing circuitry.

8. A system comprising:
   a current estimator configured to estimate a current consumption of processing circuitry;
   a current change estimator configured to estimate a change in the current consumption based at least upon the current consumption;
   a clock generator configured to supply a clock signal to a plurality of blocks of the processing circuitry; and
   a deletion module configured to cause an omission of a clock pulse from the clock signal based at least upon the change in the current consumption and a predetermined threshold amount, wherein the current consumption of the processing circuitry is estimated based on an identification of a block of the processing circuitry that is currently active during each clock pulse of the clock signal.

9. The system of claim 8, wherein the current estimator is further configured to identify a portion of the plurality of blocks that is enabled.

10. The system of claim 9, wherein each block comprises a respective clock gate for enabling a corresponding block, wherein each clock gate is communicatively coupled to the current estimator for identifying the portion of the plurality of blocks that is enabled.

11. The system of claim 9, wherein each block corresponds to a respective predetermined current consumption amount, wherein the current consumption is estimated according to the respective predetermined current consumption amount associated with the portion of the plurality of blocks that is enabled.

12. The system of claim 8, wherein the current estimator is configured to estimate the current consumption at each clock pulse in the clock signal.

13. The system of claim 12, wherein the current estimator comprises a rolling average filter for estimating the current consumption over a predetermined number of clock pulses.

14. The system of claim 13, further comprising a feedback loop configured to adjust the rolling average filter in response to the omission of the clock pulse.

15. A system comprising:
   processing circuitry comprising:
   a clock generator configured to generate a clock signal, the clock signal comprising a series of clock pulses;
   a current change estimator configured to estimate a change in current consumption of the processing circuitry, based on an identification of a block of the processing circuitry that is currently active during each clock pulse of the clock signal; and
   a deletion module configured to instruct the clock generator to omit a clock pulse from the clock signal in response to the change in current consumption exceeding a predetermined threshold amount.

16. The system of claim 15, wherein the processing circuitry further comprises an instruction decoder for determining an instruction type, wherein the processing circuitry is configured to associate the instruction type to a predetermined current consumption amount based at least upon a lookup table, wherein the estimation of the change in current consumption is based at least upon the predetermined current consumption amount.

17. The system of claim 15, wherein the processing circuitry further comprises:
   a pair of terminals for receiving a current from a power source; and
   a current sink coupled between the pair of terminals.

18. The system of claim 17, wherein the processing circuitry is configured to sink the current via a current sink in response to the change in current consumption being less than another predetermined threshold amount.

19. The system of claim 15, wherein the current change estimator is further configured to estimate the change in current consumption based at least upon a temperature associated with the processing circuitry.

20. The system of claim 15, wherein the processing circuitry further comprises a feedback loop for adjusting estimation of the change in current consumption based at least upon omitting the clock pulse from the clock signal.

* * * * *